(12) United States Patent
Agarwal et al.

(10) Patent No.: US 8,281,263 B2
(45) Date of Patent: Oct. 2, 2012

(54) PROPAGATING DESIGN TOLERANCES TO SHAPE TOLERANCES FOR LITHOGRAPHY

(75) Inventors: Kanak Agarwal, Austin, TX (US); Shayak Banerjee, Austin, TX (US); Sani Nassif, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 12/640,129

(22) Filed: Dec. 17, 2009

(65) Prior Publication Data

US 2011/0154280 A1    Jun. 23, 2011

(51) Int. Cl.
*G06F 17/50* (2006.01)
*G06F 9/455* (2006.01)

(52) U.S. Cl. ............... 716/50; 716/51; 716/54; 716/55; 716/110; 716/111; 716/113

(58) Field of Classification Search .................. None
See application file for complete search history.

(56) References Cited

U.S. PATENT DOCUMENTS

| | | | |
|---|---|---|---|
| 6,826,733 B2 | 11/2004 | Hathaway et al. ............... 716/2 |
| 7,266,798 B2 * | 9/2007 | Mansfield et al. ............. 716/52 |
| 7,458,245 B1 * | 12/2008 | Wilcox ..................... 72/391.8 |
| 7,533,359 B2 * | 5/2009 | Scheffer et al. .............. 716/106 |
| 7,568,179 B1 | 7/2009 | Kroyan et al. ................. 716/19 |
| 7,574,682 B2 | 8/2009 | Riviere-Cazaux ............... 716/4 |
| 7,607,114 B2 * | 10/2009 | Mansfield et al. ............. 716/53 |
| 7,783,999 B2 * | 8/2010 | Ou et al. ...................... 716/136 |
| 7,865,864 B2 * | 1/2011 | Banerjee et al. .............. 716/53 |
| 2008/0270956 A1 * | 10/2008 | Murakami ...................... 716/5 |
| 2009/0019418 A1 | 1/2009 | Kotani et al. ................ 716/19 |
| 2009/0055788 A1 | 2/2009 | Cote et al. ..................... 716/6 |
| 2009/0199151 A1 * | 8/2009 | Banerjee et al. .............. 716/20 |

OTHER PUBLICATIONS

S. Banerjee et al., Coupling Timing Objectives with Optical Proximity Correction for Improved Timing, 12th International Symposium on Quality Electronic Design, pp. 1-6, Mar. 2011.*
Gupta et al., Performance-Driven OPC for Mask Cost Reduction, Proceedings of the Sixth International Symposium on Quality Electronic Design, pp. 270-275, Mar. 2005.*
Banerjee et al., Electrically driven Optical Proximity Correction Based on Linear Programming, IEEE/ACM International Conference on Computer-Aided Dsign, pp. 473-479, Nov. 2008.*

* cited by examiner

*Primary Examiner* — Leigh Garbowski
*Assistant Examiner* — A. M. Thompson
(74) *Attorney, Agent, or Firm* — VanLeeuwen & VanLeeuwen; Libby L. Toub (57) ABSTRACT

An approach is provided that computes electrical delay ranges that correspond to a number of shapes included in a hardware design layout. The electrical delay ranges are converted to shape tolerances for each of the shapes. A lithography mask of the hardware design layout is generated using the shape tolerances so that the images of the shapes in the mask produced lie within the shape tolerances that correspond to the respective shape.

20 Claims, 7 Drawing Sheets

PROPAGATING DESIGN TOLERANCES TO SHAPE TOLERANCES FOR LITHOGRAPHY

TECHNICAL FIELD

The present disclosure relates to an approach for understanding design tolerances in a semiconductor design. More specifically, the present disclosure relates to an approach that propagates these design tolerances to shape tolerances used in the lithographic process.

BACKGROUND

Lithography, such as photolithography, is a method used to structure material on a precise scale and is often used in the manufacture of semiconductors (e.g., microchips). Lithography employed to create semiconductors uses a photomask as a master from which a final pattern is created. Current methodologies of lithography treat the target layout (pattern) as a fixed requirement. Having fixed requirements in lithography is increasingly challenging due to modern semiconductor designs that pack more and more design elements in a smaller package. In order to fit the increased number of design elements on a small package, tolerances of the mask must often be extremely tight. These tight tolerances result various challenges, such as increased time to create a mask, which result in increased cost to manufacture the semiconductors.

SUMMARY

An approach is provided that computes electrical delay ranges that correspond to a number of shapes included in a hardware design layout. The electrical delay ranges are converted to a shape tolerances for each of the shapes. A lithography mask of the hardware design layout is generated using the shape tolerances so that the shapes in the lithography mask are masked within the shape tolerances that correspond to the respective shape.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
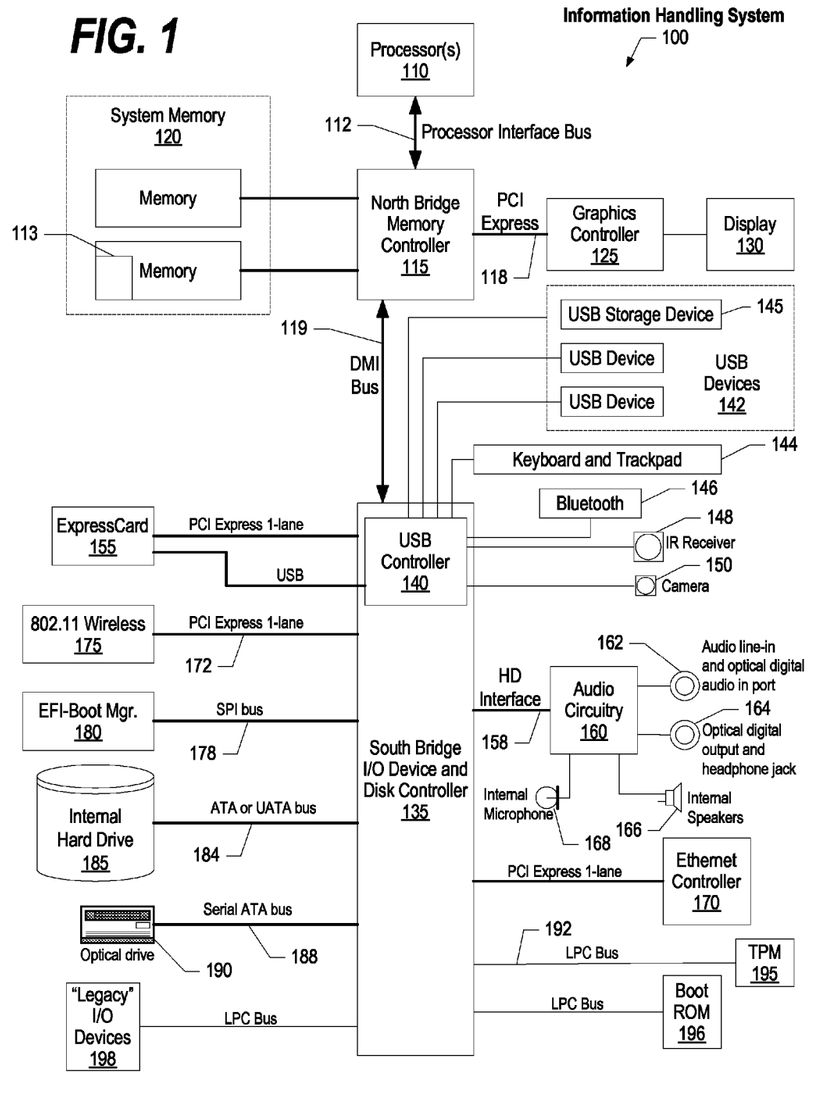
FIG. 1 is a block diagram example of a data processing system in which the methods described herein can be implemented.
Figure 2:
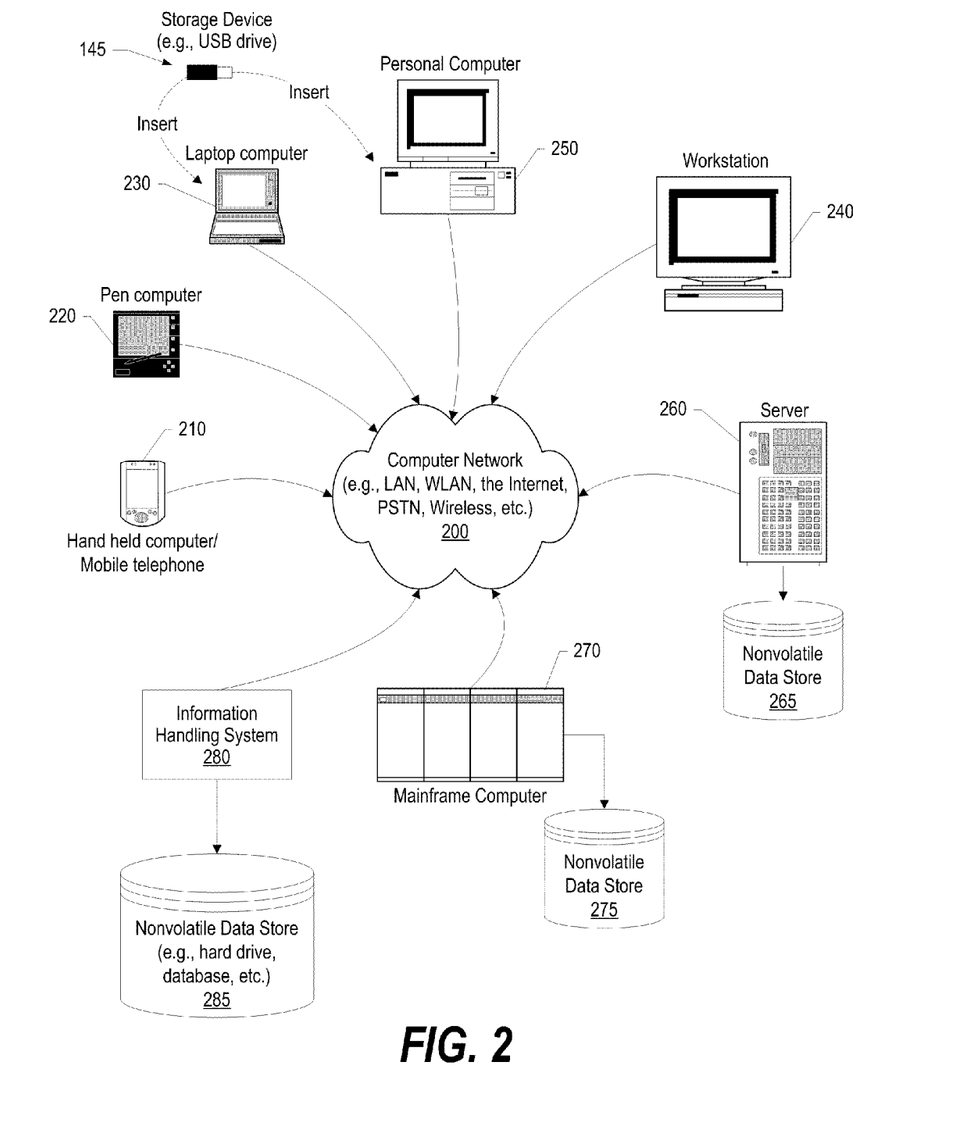
FIG. 2 provides an extension example of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Set of instructions 113 are stored in system memory 120 for execution by the one or more processors 110. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
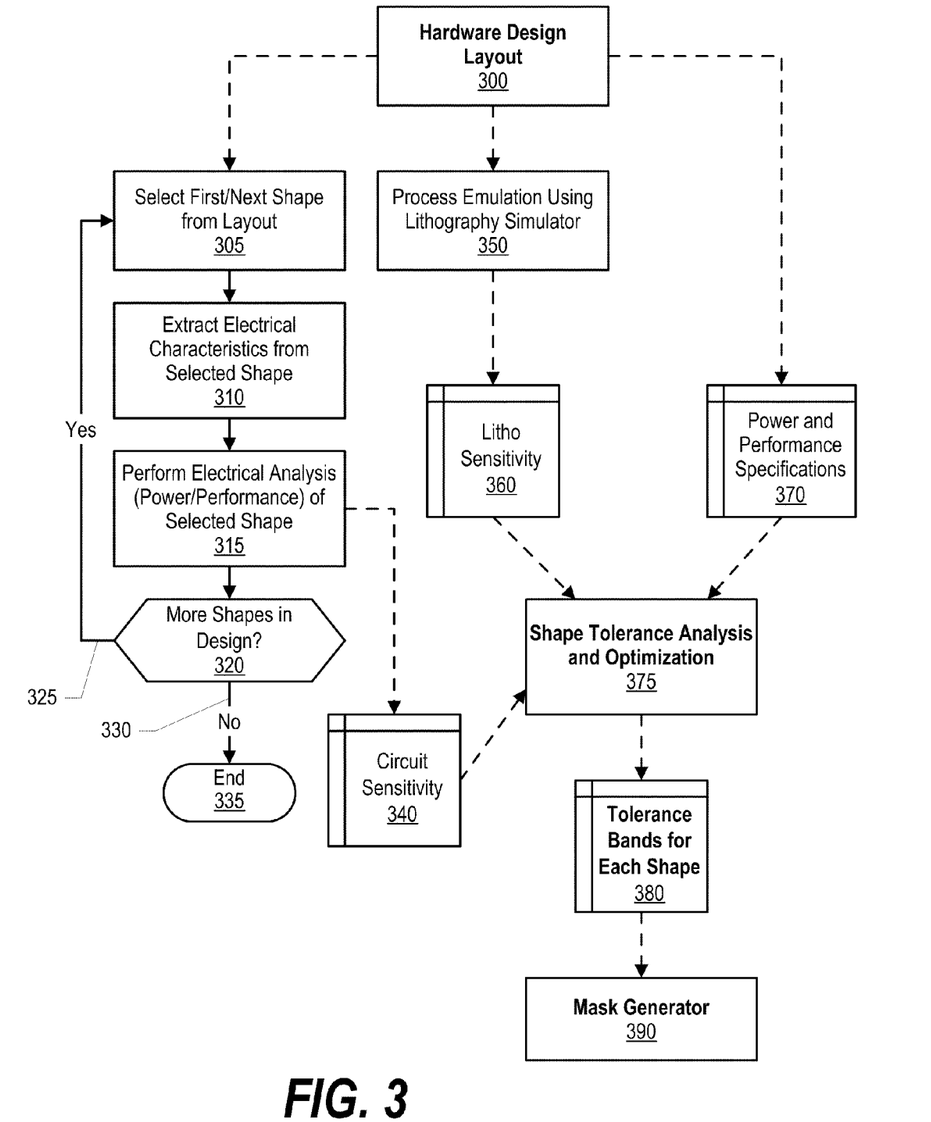
FIG. 3 is a flow diagram showing the steps taken to generate shape slack information and lithography tolerance bands.

FIG. 3 is a flow diagram showing the steps taken to generate shape slack information and lithography tolerance bands. Three types of information are extracted from hardware design layout 300. In the example shown, circuit sensitivity information is extracted using the process on the left hand side, lithography sensitivity is extracted using the process in the middle, and power and performance specifications are extracted along the right hand side.

In the process shown on the left side that extracts circuit sensitivity, at step 305, the first shape is selected from hardware design layout 300. At step 310, the electrical characteristics are extracted from the selected shape At step 315, an electrical analysis (e.g., analysis of power and performance) is performed on the selected shape. Steps 310 and 315 may be performed by using a standard circuit simulator to extract circuit parameters at different configurations of the shape in question. The circuit sensitivity data derived from the electrical analysis are stored in circuit sensitivity data store 340. A determination is made as to whether there are more shapes in the design that need to be extracted and analyzed (decision 320). While there are more shapes to analyze, decision 320 loops back to step 305 to select and process the next shape. This looping continues until there are no further shapes to analyze, at which point decision 320 branches to "no" branch 330 whereupon circuit sensitivity extraction and analysis ends at 335.

Lithography sensitivity process is extracted using the process shown in the middle of FIG. 3. Here, at step 350, a lithography simulator is used to process an emulation of the hardware design layout. The lithography simulator uses models of the manufacturing process to generate the expected shape on the wafer from the given target shape. Results of the simulation point to the degree of difficulty in printing a given shape. This results in lithography sensitivity data that is stored in data store 360. One possible metric for comparing lithography sensitivity is to compute the area of the process variability bands (PV Bands) for a given shape. The band comprises of wafer contours at different process conditions and is indicative of how the feature will behave under variability in the manufacturing process. A shape more difficult to print will have wider PV Bands and a shape that is more easily printed will have narrower PV Bands.

Power and performance specifications are extracted on the right side of FIG. 3. As shown, power and performance specifications data store 370 is used to store the power and performance specifications that pertain to hardware design layout 300.

At step 375, shape tolerance analysis and optimization is performed using circuit sensitivity data 340, lithography sensitivity 360, and power and performance specifications 370 as inputs. Step 340 is explained in greater detail in FIG. 4, while step 375 is explained in greater detail in FIGS. 5 through 7. The result of step 375 are tolerance bands for each shape which are stored in tolerance bands data store 380. These tolerance bands are then used by mask generator 390 to generate the photolithographic mask. These tolerance bands provide a range of layouts that can provide electrical performance that are each within tolerance. In essence, tolerance bands are designer-approved tolerances for the lithography that aid manufacturing of the masks by allowing greater lithography flexibility without impacting the performance of the hardware design.

Figure 4:
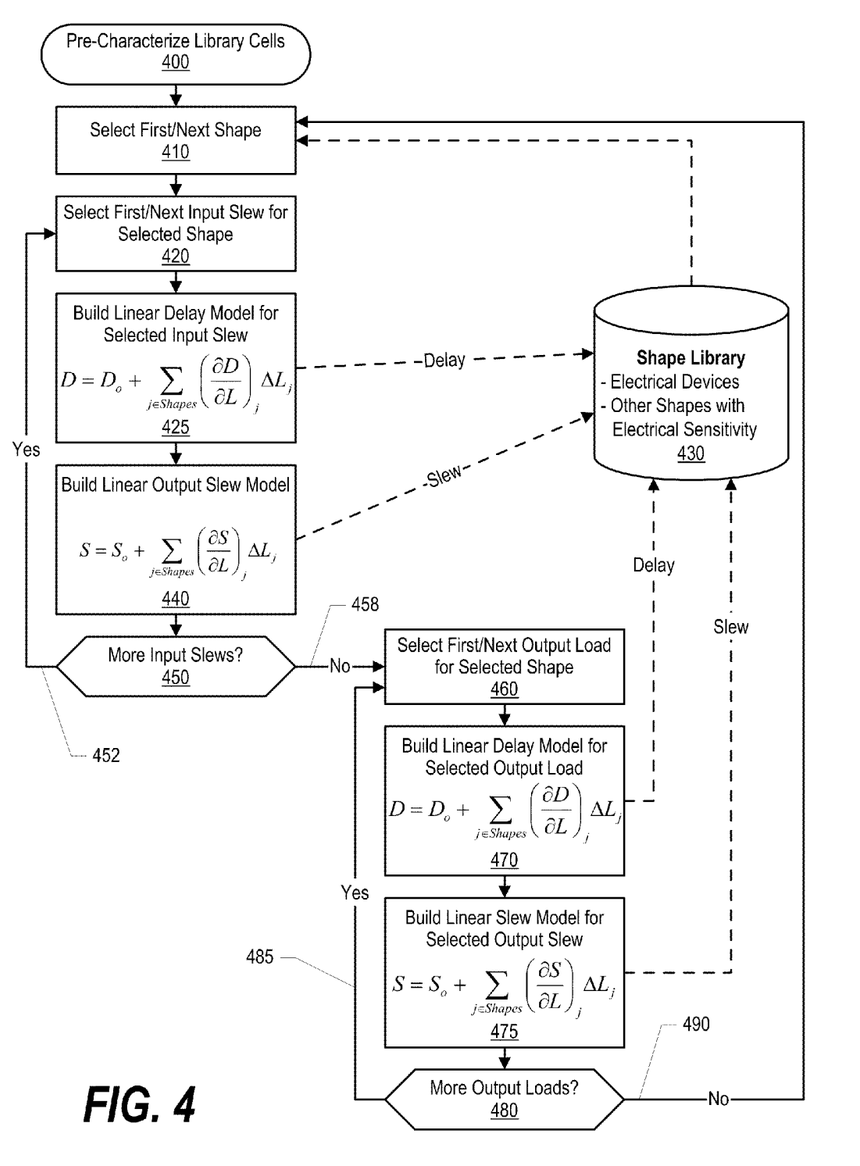
FIG. 4 is a flowchart showing the steps taken to pre-characterize library cells that are stored in a shape library.

FIG. 4 is a flowchart showing the steps taken to pre-characterize library cells that are stored in a shape library. Processing commences at 400 whereupon, at step 410, the first shape is selected from shape library 430. In this example, shapes are the transistors representing by polysilicon overlapping active area. A determination is made as to whether there are more input slews to process (decision 450). If there are more input slews to process for the selected shape, then decision 450 branches to "yes" branch 452 which loops back to select the next input slew for the selected shape. This looping continues until all input slews for the selected shape have been selected and processed, at which time decision 450 branches to "no" branch 485. Shape library 430 is a data store that is used to store data pertaining to shapes used in hardware designs. As the name of the flowchart indicates, the processing performed in FIG. 3 can be performed before any hardware designs need to be analyzed so that the delay and slew data pertaining to the shapes will be available when hardware designs are ready for analysis. At step 420, the first input slew is selected for the selected shape. Input slew is the time taken for the signal at the input of a gate to change from its initial value to its final value and is representative of the slope or how slow/fast the signal changes. A faster changing signal will result in lower delay and a slower changing signal will result in a faster delay. At step 425, a linear delay model is built for the selected input slew. The mathematical formula relates the change in delay at the output of the gate to the change in the shape dimension (which is gate length in this case) using a linear function. The delay data resulting from this formula is stored in shape library 430. At step 440 the linear output slew model is built. Output slew is the slew or slope at the output of a gate as opposed to the input of a gate. A determination is made as to whether there are more input slews to process (decision 450). If there are more input slews to process for the selected shape, then decision 450 branches to "yes" branch 452 which loops back to select the next input slew for the selected shape. This looping continues until all input slews for the selected shape have been selected and processed, at which time decision 450 branches to "no" branch 458.

At step 460, the first output load is selected for the selected shape. Output slew is the slope of the signal at the output of the gate, representing how fast or slow it changes. Output load is the capacitance on the output pin of the gate. The higher the capacitance, the slower the signal will change.] At step 470, a linear model is built for the selected output slew. Once again, the delay model relates the output delay of the cell to the change in shape dimension (in this case, gate length) using a linear approximation. The delay data resulting from this formula is stored in shape library 430. At step 475, the linear slew model is built for the selected output slew. A determination is made as to whether there are more output slews to process (decision 480). If there are more output slews to process for the selected shape, then decision 480 branches to "yes" branch 485 which loops back to select the next output slew for the selected shape. This looping continues until all output slews for the selected shape have been selected and processed, at which time decision 480 branches to "no" branch 490 which loops back to step 410 which selects the next shape from shape library 430 and builds the delay and slew models as described above. This looping continues until all of the shapes in shape library 430 have been processed, at which the processing shown in FIG. 4 ends. As new shapes are added to shape library 430 (e.g., because of a new hardware design, etc.), these new shapes are characterized using the steps shown in FIG. 4 so that the delay and slew data is available in the shape library.

Figure 5:
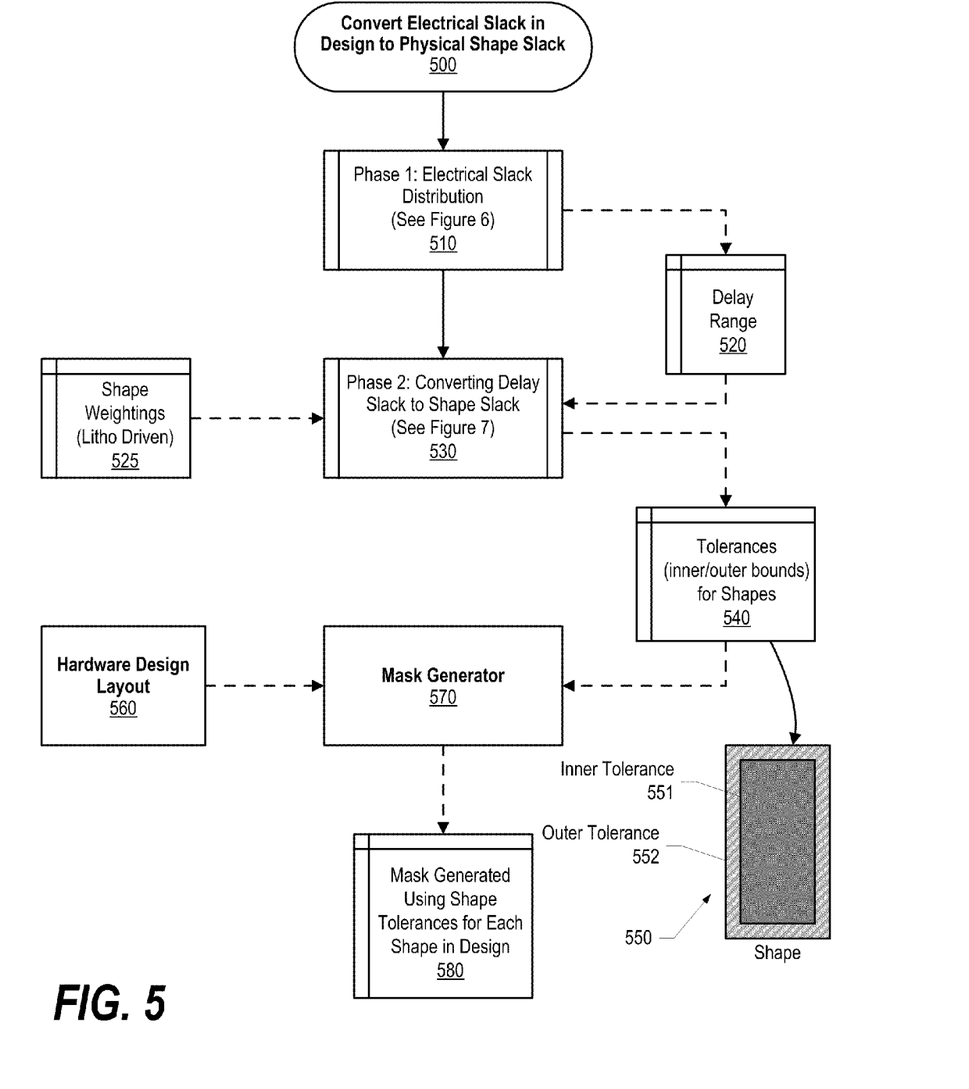
FIG. 5 is a flowchart showing the steps taken to convert electrical slack in the hardware design to physical shape slack.

FIG. 5 is a flowchart showing the steps taken to convert electrical slack in the hardware design to physical shape slack. Processing commences at 500 whereupon, during a first phase, predefined process 510 is performed to determine the electrical slack distribution (see FIG. 6 and corresponding text for processing details). Electrical slack is for the design as a whole. FIG. 5 shows how to propagate this slack to shapes in the design in the form of shape slack. The delay range resulting from predefined process 510 is stored in delay range 520. Delay range represents the maximum and minimum values of delay within which a gate can operate while still meeting design requirements.

Figure 7:
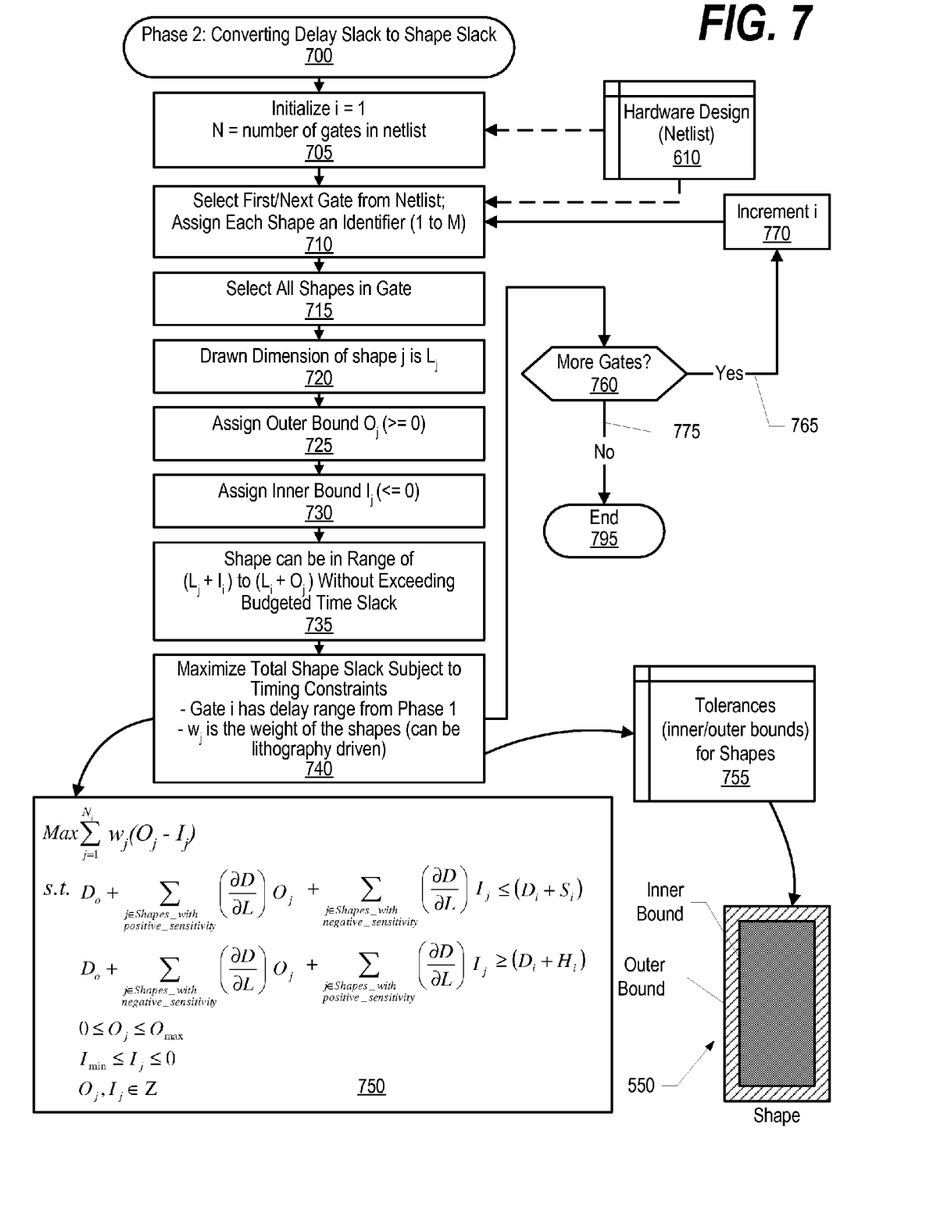
FIG. 7 is a flowchart of a second phase in converting the electrical slack in the design to physical shape slack by converting the delay slack to shape slack.

During a second phase, predefined process 530 is performed to convert the delay slack into shape slack (see FIG. 7 and corresponding text for processing details). Inputs to predefined process 530 include shape weightings 525 which is provided by lithography processes as well as delay range data 520 resulting from phase 1. The data for 520 is obtained by the procedure described for 360 previously shown in FIG. 3. The result of predefined process 530 are tolerances data 540 which indicate the inner and outer bounds of a shape (e.g., shape 550). As shown in the example, shape 550 has inner bound (tolerance) 551 which is a smaller footprint than outer bound (tolerance) 552. So long as the shape is generated within these inner and outer bounds it will be acceptable to the hardware design. Mask generator 570 generates mask 580 taking the hardware design layout 560 as input as well as tolerances data 540. The mask generator has flexibility to generate the mask for the hardware design layout using the tolerances (inner/outer tolerances) provided for each shape. Some shapes might have tighter, or more precise, tolerances than other shapes in the design.

Figure 6:
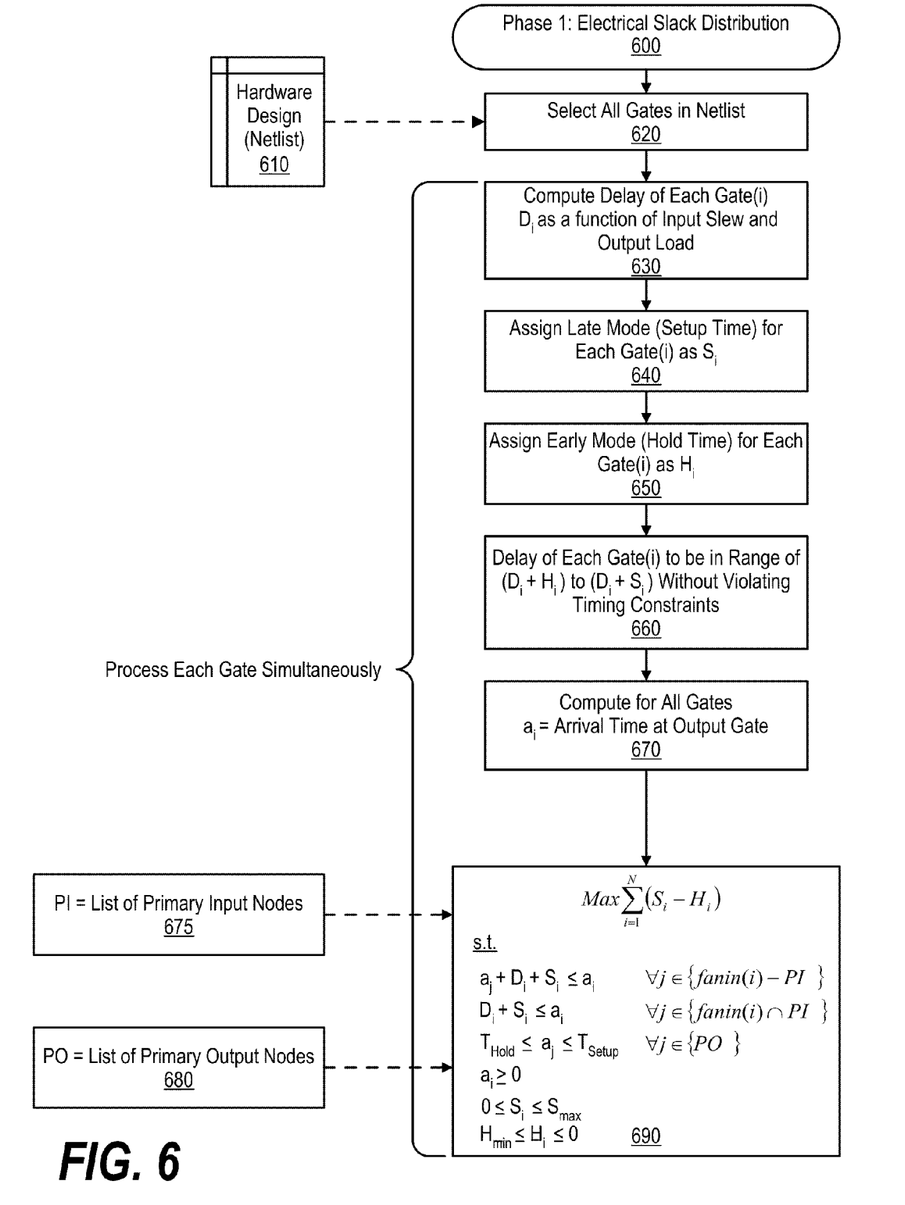
FIG. 6 is a flowchart of a first phase in converting the electrical slack in the design to physical shape slack by analyzing the electrical slack distribution in the design.

FIG. 6 is a flowchart of a first phase in converting the electrical slack in the design to physical shape slack by analyzing the electrical slack distribution in the design. Processing commences at 600 whereupon, at step 620 all of the gates in the hardware design are selected at the same time. The hardware design representation is netlist data store 610. All of the gates in the netlist are selected simultaneously because the way in which the slack gets divided amongst the gates depends on how they are interconnected. For example, if there are five gates connected to each other on a path with some slack, the slack should be divided equally among the five gates as opposed to giving all the slack to just one of the gates. Each gate selected from hardware design 610 is processed by steps 630 to 690 in parallel (essentially, simultaneously with the other gates). At step 630, the delay of each gate is computed as a function of the input slew and output load pertaining to each of the gates. This is a well-known computation that is done by all timing tools. It involves the use of lookup tables. At step 640, slack variables are established for each gate ($S_i$) and assigned to each gate's late mode (which is constrained by setup time). The late mode of a gate determines the latest time at which the output of a gate will change. Early mode determines the opposite, i.e. what is the earliest at which the output of the gate will change. The latest arriving time is constrained by the setup time at a latch/flip-flop into which the output of the gate will be stored. Early mode is constrained by the hold time of the same latch/flip-flop. At step 650, slack variables are established for each gate ($H_i$) and assigned to each gate's early mode which is constrained by hold time. At step 660, the allowable delay range of each gate is computed to be in the range of the sum of the delay and the hold time to the sum of the delay and the late mode (in the range of ($D_i+H_i$) to ($D_i+S_i$)). So long as the delay of each of the gates is between this range (established for each of the gates) the timing constraints of the hardware design will not be violated. At step 670, the arrival time at each gate's output gate ($a_i$) is computed.

The delays, setup times, hold times, allowable ranges, and arrival times are fed into the equation shown in step 690 along with the list of primary input nodes (675) and the list of primary output nodes (680). Step 690 takes as input, the delays of each gate along with their connectivity as well as the design constraints in terms of setup times and hold times at each flop/latch. It then uses the optimization formulation outlined to generate the delay slack values ($S_i,H_i$) for each gate such that design constraints are satisfied. The optimization formulation for 690 may be solved as a linear program (LP) using a commercial LP solver.

FIG. 7 is a flowchart of a second phase in converting the electrical slack in the design to physical shape slack by converting the delay slack to shape slack. In FIG. 7, the delay ranges computed in FIG. 6 are converted to allowable shape tolerances. Processing commences at 700 whereupon, at step 705, the number of gates in hardware design 610 is identified (set in the example to variable N). The current gate that is being processed is set to the first gate (initializing variable i to 1). At step 710, the first gate from netlist 610 is selected and each shape in the selected gate is assigned an identifier (1 to M with M being the number of shapes in the selected gate). At step 715, all of the shapes (1 to M) in the selected gate are selected for simultaneous (or near-simultaneous) processing. At step 720, the drawn dimension of each shape is assigned to the variable L (e.g., $L_1$ to $L_M$). At step 725, an outer bound of each shape is assigned to the variable O (e.g., $O_1$ to $O_M$). Likewise, at step 730, an inner bound of each shape is assigned to the variable I (e.g., $I_1$ to $I_M$). When processing is completed, each of the shapes will have a computed inner and outer bound value assigned that specifies a physical range tolerance. So, for example, the first shape in the netlist will have a drawn dimension of $L_1$, an inner bound dimension of $I_1$, and an outer bound dimension of $O_1$. When the mask generator is generating the mask for this first shape, the shape of the mask can be anywhere between these bounds and still create an acceptable mask for the hardware design.

At step 740, the total shape slack (range) is maximized using the equations shown in 750 and is subject to timing constraints determined in Phase 1 (see FIG. 6 and corresponding text for details regarding computation of timing constraints). Each gate has a delay range that was computed in Phase 1. In addition, each of the shapes can have a weight applied. In one embodiment, the weight can be driven by lithography processes. Box 750 describes the optimization formulation for generating an inner ($I_j$) and outer ($O_j$) tolerance on each shape in a gate given the range of delay values ($D_i+H_i,D_i+S_i$) that the gate can take. The weights (wj) are obtained from the computations performed for litho sensitivity in 360. The result of step 740 are tolerances stored in tolerances data store 755 that include inner and outer bounds ($I_j$ and $O_j$) for each shape in the gate. These tolerances are used by the mask generator to create shapes (e.g. shape 550) within this physical range tolerance.

A determination is made as to whether there are more gates in the hardware design to process (decision 760). If there are more gates to process, decision 760 branches to "yes" branch 765 whereupon, at step 770, the gate variable (i) is incremented to represent the next gate in the hardware design. Processing then loops to the beginning of the process (step 710) to select the next gate in the design, select all of the shapes in the next gate, and process the selected shapes as described above. This looping continues until there are no more gates in hardware design 610 to process, at which point decision 760 branches to "no" branch 775 and processing ends at 795.

The flowchart and block diagrams in the FIGures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
computing, by a processor, a plurality of electrical delay ranges corresponding to a plurality of shapes included in a hardware design layout;
creating a plurality of shape tolerances, wherein each shape tolerance of the plurality of shape tolerances are applied to one of the plurality of shapes, and wherein each shape tolerance of the plurality of shape tolerances is based on a corresponding computed electrical delay range in the plurality of computed electrical delay ranges; and
generating a lithography mask of the hardware design layout, wherein images of each of the shapes is included in the lithography mask within the shape tolerances that correspond to each of the shapes.

2. The machine implemented method of claim 1, wherein the computing of the plurality of electrical delay ranges further comprises:

selecting a plurality of gates included in a netlist corresponding to the hardware design layout, wherein each gate includes one or more of the plurality of shapes;

computing a delay of each gate as a function of an input slew and an output load corresponding to each gate; and computing the plurality of electrical delay ranges corresponding to each of the gates as being between an early value and a late value, wherein the early value is the computed delay corresponding to each gate added to a hold time corresponding to each gate, and wherein the late value is the computed delay corresponding to each gate added to a setup time corresponding to each gate.

3. The machine implemented method of claim 2, further comprising:

selecting a first gate of the plurality of gates;

selecting all of the shapes included in the first gate;

retrieving a drawn dimension of each shape; and computing a minimum inner bound and a maximum outer bound corresponding to each shape using the computed early and late values, wherein the shape tolerance corresponding to each shape include the computed minimum inner bound and maximum outer bound.

4. The machine implemented method of claim 3, further comprising:

retrieving a weighting value corresponding to at least one of the shapes, wherein the computing of the minimum inner bound and maximum outer bound applies the weighting value to the computation.

5. The machine implemented method of claim 3, further comprising:

generating the lithography mask of the hardware design layout wherein a plurality of the shapes included in the lithography mask have different dimensions than the retrieved drawn dimension of the shape.

6. The machine implemented method of claim 2, wherein selection, computation of delay, and computation of the plurality of electrical delay ranges of each of the gates are performed in parallel.

7. The machine implemented method of claim 1, further comprising:

retrieving a list of primary input nodes and a list of primary output nodes for a plurality of gates included in a netlist corresponding to the hardware design layout; and computing the plurality of electrical delay ranges based upon the primary input nodes and the primary output nodes corresponding to the plurality of gates.

8. A computer readable storage medium having instructions stored thereon that, when executed by an information handling system, cause the information handling system to perform actions that include:

computing, by a processor, a plurality of electrical delay ranges corresponding to a plurality of shapes included in a hardware design layout;

creating a plurality of shape tolerances, wherein each shape tolerance of the plurality of shape tolerances are applied to one of the plurality of shapes, and wherein each shape tolerance of the plurality of shape tolerances is based on a corresponding computed electrical delay range in the plurality of computed electrical delay ranges; and generating a lithography mask of the hardware design layout, wherein images of each of the shapes is included in the lithography mask within the shape tolerances that correspond to each of the shapes.

9. The computer readable storage medium of claim 8, wherein the computing of the plurality of electrical delay ranges further comprises additional actions comprising:

selecting a plurality of gates included in a netlist corresponding to the hardware design layout, wherein each gate includes one or more of the plurality of shapes;

computing a delay of each gate as a function of an input slew and an output load corresponding to each gate; and computing the plurality of electrical delay ranges corresponding to each of the gates as being between an early value and a late value, wherein the early value is the computed delay corresponding to each gate added to a hold time corresponding to each gate, and wherein the late value is the computed delay corresponding to each gate added to a setup time corresponding to each gate.

10. The computer readable storage medium of claim 9, wherein the instructions cause the information handling system to perform further actions comprising:

selecting a first gate of the plurality of gates;

selecting all of the shapes included in the first gate;

retrieving a drawn dimension of each shape; and computing a minimum inner bound and a maximum outer bound corresponding to each shape using the computed early and late values, wherein the shape tolerance corresponding to each shape include the computed minimum inner bound and maximum outer bound.

11. The computer readable storage medium of claim 10, wherein the instructions cause the information handling system to perform further actions comprising:

retrieving a weighting value corresponding to at least one of the shapes, wherein the computing of the minimum inner bound and maximum outer bound applies the weighting value to the computation.

12. The computer readable storage medium of claim 10, wherein the instructions cause the information handling system to perform further actions comprising:

generating the lithography mask of the hardware design layout wherein a plurality of the shapes included in the lithography mask have different dimensions than the retrieved drawn dimension of the shape.

13. The computer readable storage medium of claim 8, wherein the actions of selecting, computing a delay, and computing the plurality of electrical delay ranges of each of the gates are performed in parallel.

14. The computer readable storage medium of claim 8, wherein the instructions cause the information handling system to perform further actions comprising:

retrieving a list of primary input nodes and a list of primary output nodes for a plurality of gates included in a netlist corresponding to the hardware design layout; and computing the plurality of electrical delay ranges based upon the primary input nodes and the primary output nodes corresponding to the plurality of gates.

15. An information handling system comprising:

one or more processors;

a memory accessible by at least one of the processors;

a nonvolatile storage area accessible by at least one of the processors;

wherein the memory stores a set of instructions, which when executed by at least one of the processors, performs actions of:

computing a plurality of electrical delay ranges corresponding to a plurality of shapes included in a hardware design layout;

creating a plurality of shape tolerances, wherein each shape tolerance of the plurality of shape tolerances are applied to one of the plurality of shapes, and wherein each shape tolerance of the plurality of shape tolerances is based on a corresponding computed electrical delay range in the plurality of computed electrical delay ranges; and generating a lithography mask of the hardware design layout, wherein images of each of the shapes is included in the lithography mask within the shape tolerances that correspond to each of the shapes.

16. The information handling system of claim 15, wherein the computing of the plurality of electrical delay ranges causes the processor to perform further actions comprising:

selecting a plurality of gates included in a netlist corresponding to the hardware design layout, wherein each gate includes one or more of the plurality of shapes;

computing a delay of each gate as a function of an input slew and an output load corresponding to each gate; and computing the plurality of electrical delay ranges corresponding to each of the gates as being between an early value and a late value, wherein the early value is the computed delay corresponding to each gate added to a hold time corresponding to each gate, and wherein the late value is the computed delay corresponding to each gate added to a setup time corresponding to each gate.

17. The information handling system of claim 16, wherein the information handling system performs further actions comprising:

selecting a first gate of the plurality of gates;
selecting all of the shapes included in the first gate;
retrieving a drawn dimension of each shape; and
computing a minimum inner bound and a maximum outer bound corresponding to each shape using the computed early and late values, wherein the shape tolerance corresponding to each shape include the computed minimum inner bound and maximum outer bound.

18. The information handling system of claim 17, wherein the information handling system performs further actions comprising:

retrieving a weighting value corresponding to at least one of the shapes, wherein the computing of the minimum inner bound and maximum outer bound applies the weighting value to the computation.

19. The information handling system of claim 17, wherein the information handling system performs further actions comprising:

generating the lithography mask of the hardware design layout wherein a plurality of the shapes included in the lithography mask have different dimensions than the retrieved drawn dimension of the shape.

20. The information handling system of claim 16, wherein the actions of selecting, computing a delay, and computing the plurality of electrical delay ranges of each of the gates are performed in parallel.

* * * * *